US012594751B2

(12) United States Patent
Chen et al.

(10) Patent No.: US 12,594,751 B2
(45) Date of Patent: Apr. 7, 2026

(54) FILM STICKING DEVICE

(71) Applicant: SHENZHEN KUKASHI TECHNOLOGY CO., LTD, Shenzhen (CN)

(72) Inventors: Guicheng Chen, Shenzhen (CN); Hemao Huang, Shenzhen (CN)

(73) Assignee: SHENZHEN KUKASHI TECHNOLOGY CO., LTD, Shenzhen (CN)

( * ) Notice: Subject to any disclaimer, the term of this patent is extended or adjusted under 35 U.S.C. 154(b) by 105 days.

(21) Appl. No.: 18/431,178

(22) Filed: Feb. 2, 2024

(65) Prior Publication Data

US 2025/0236101 A1 Jul. 24, 2025

Related U.S. Application Data

(63) Continuation of application No. PCT/CN2024/074066, filed on Jan. 25, 2024.

(30) Foreign Application Priority Data

Jan. 22, 2024 (CN) .......................... 202420154092.8

(51) Int. Cl.
B32B 41/00 (2006.01)
B32B 37/00 (2006.01)
(52) U.S. Cl.
CPC ...... B32B 37/0046 (2013.01); *B32B 2457/20* (2013.01)
(58) Field of Classification Search
CPC .......................... B32B 37/0046; B32B 2457/20
USPC .................... 156/60, 64, 350, 351, 378, 379
See application file for complete search history.

(56) References Cited

U.S. PATENT DOCUMENTS

| | | | | |
|---|---|---|---|---|
| 2022/0388233 | A1* | 12/2022 | MacDonald | ........... B29C 63/02 |
| 2023/0024617 | A1 | 1/2023 | Yu et al. | |
| 2023/0191767 | A1 | 6/2023 | Zhang et al. | |

FOREIGN PATENT DOCUMENTS

| | | |
|---|---|---|
| CN | 111392245 A | 7/2020 |
| CN | 218877706 U | 4/2023 |
| CN | 219134655 U | 6/2023 |
| CN | 219989612 U | 11/2023 |
| CN | 220243658 U | 12/2023 |

OTHER PUBLICATIONS

International Search Report and Written Opinion issued in corresponding PCT Application No. PCT/CN2024/074066, dated Oct. 10, 2024.

* cited by examiner

*Primary Examiner* — Michael N Orlando
*Assistant Examiner* — Joshel Rivera
(74) *Attorney, Agent, or Firm* — Westbridge IP LLC

(57) ABSTRACT

Disclosed is a film sticking device. The film sticking device includes an upper cover, a base and an inner tray, the upper cover is movably connected to a side of the upper cover; the inner tray includes a chassis and a limiting frame provided at the chassis, the limiting frame encloses a receiving groove on the chassis, an inner wall of the limiting frame is provided with a limiting step configured for installing a screen protection film, a positioning notch and a pulling notch are respectively provided at two opposite sides of the limiting frame; and the inner tray is detachably installed at the base, and the upper cover is configured to cover the receiving groove.

18 Claims, 17 Drawing Sheets

FILM STICKING DEVICE

CROSS-REFERENCE TO RELATED APPLICATIONS

This application is a continuation application of International Application No. PCT/CN2024/074066, filed on Jan. 25, 2024, which claims priority to Chinese Patent Application No. 202420154092.8, filed on Jan. 22, 2024. The disclosures of the above-mentioned applications are incorporated herein by reference in their entireties.

TECHNICAL FIELD

The present application relates to the field of film sticking technology, and in particular to a film sticking device.

BACKGROUND

In order to protect the screens of mobile terminal devices such as mobile phones and tablet computers from being scratched during use, a screen protection film is usually attached to the screen to protect the screen. Sticking the screen protection film at one time often requires extensive film sticking experience, otherwise it will be difficult to ensure that blisters will not occur or the film may be applied crookedly, and repeated adjustments also easily cause the entire screen protection film to be scrapped. Therefore, it is often necessary to use a film sticking device to assist the film sticking to improve the success rate of film sticking. However, the inner tray in the film sticking device is prone to deformation, thus causing users to have to purchase a new film sticking device when they need to stick the film again, thereby increasing costs.

SUMMARY

The main purpose of the present application is to propose a film sticking device, which aims to realize the direct replacement of the inner tray in the film sticking device without the need to purchase the film sticking device multiple times to reduce the cost of film sticking.

In order to achieve the above purpose, the film sticking device proposed in the present application includes:

an upper cover and a base, and the upper cover is movably connected to a side of the upper cover;

an inner tray including a chassis and a limiting frame provided at the chassis, the limiting frame encloses a receiving groove on the chassis, an inner wall of the limiting frame is provided with a limiting step configured for installing a screen protection film, and a positioning notch and a pulling notch are respectively provided at two opposite sides of the limiting frame; and the inner tray is detachably installed at the base, and the upper cover is configured to cover the receiving groove.

In an embodiment, the inner tray is snap-connected to the base.

In an embodiment, the chassis is provided with an installing skirt edge on an outside of the limiting frame, and the installing skirt edge is snap-connected to the base.

In an embodiment, the base includes a baseplate and a snapping plate fixed on the baseplate, the snapping plate is fixed at a side of the baseplate facing the upper cover, and the chassis is snap-connected to the snapping plate.

In an embodiment, a first compacting protrusion is provided at a side of the upper cover facing the inner tray; and a second compacting protrusion is provided at a side of the base facing the inner tray, a through hole is provided on the chassis, and the second compacting protrusion passes through the through hole and extends into the receiving groove.

In an embodiment, the chassis is provided with an installing skirt edge at an outside of the limiting frame, a limiting groove is formed at a periphery of the base, the limiting groove is configured to prevent the inner tray from detaching from the base in a direction closer to the upper cover, the limiting groove is provided with a pulling opening at at least one side of the base, and the installing skirt edge is inserted into the limiting groove via the pulling opening.

In an embodiment, the upper cover is provided with a first compacting protrusion at a side facing the inner tray; and a second compacting protrusion is provided at a side of the chassis facing the receiving groove.

In an embodiment, the chassis is provided with an installing skirt edge at an outside of the limiting frame, the base further includes a baseplate and a pressure frame movably connected to the baseplate, and the pressure frame is configured to be sleeved on the limiting frame and compress the installing skirt edge to the base.

In an embodiment, the base is provided with an installing groove opening toward the upper cover, the inner tray is provided at the installing groove, an avoidance position for a hand-tearing tension strap of the screen protection film to stretch out is provided at a side of the installing groove facing the pulling notch, and the upper cover is rotatably connected to a side wall of the installing groove.

In an embodiment, the avoidance position is configured as an avoidance gap opened at a groove wall of the installing groove; or the avoidance position is configured as an avoidance hole opened at a groove wall of the installing groove.

In an embodiment, the limiting step is supported at an edge of the screen protection film and allows the screen protection film to be spaced apart from the chassis.

In an embodiment, the limiting step includes a limiting surface and an abutting surface provided at an angle with the limiting surface, the limiting surface faces a side wall of the receiving groove, and the abutting surface faces an opening of the receiving groove to support the screen protection film.

In an embodiment, the abutting surface is flush with a bottom surface of the positioning notch.

In an embodiment, a first magnetic attraction portion is provided at a side of the limiting frame close to the upper cover, a second magnetic attraction portion is provided corresponding to the upper cover, and the first magnetic attraction portion and the second magnetic attraction portion are magnetically connected.

In an embodiment, the film sticking device further includes at least another inner tray, and a plurality of the inner trays are configured to be stacked.

In an embodiment, the film sticking device further includes at least one screen protection film, each screen protection film is correspondingly provided at one inner tray, the screen protection film includes a film body, a first release film and a second release film, the first release film and the second release film are respectively attached to two opposite sides of the film body; and two opposite ends of the first release film extend outward from the film body to the positioning notch and the pulling notch respectively, the second release film includes a protective layer and a hand-tearing tension strap, the protective layer is attached to a surface of the film body, and a part of the hand-tearing tension strap adjacent to the positioning notch is connected to the protective layer and extends toward the pulling notch and out of the receiving groove.

The technical solution of the present application is to provide a base and an upper cover that are movably connected on one side, the inner tray is detachably installed at the side of the base facing the upper cover, and the upper cover is configured to cover the receiving groove. Since the inner tray is easily deformed during use, the inner tray is a consumable item. The inner tray can be detachably installed on the side of the base facing the upper cover, thereby facilitating the replacement of the inner tray. When the film needs to be attached again, the user can choose to directly replace the inner tray without replacing the entire film sticking device, thereby reducing the user's film sticking cost. The inner tray includes a chassis and a limiting frame provided at the chassis, the limiting frame encloses a receiving groove on the chassis, the receiving groove can be configured for placing device to be filmed and screen protection film, thereby positioning the device to be filmed and the screen protection film. Moreover, the inner wall of the limiting frame is provided with a limiting step for installing the screen protection film, thereby further fixing the screen protection film, reducing the possibility of the screen protection film being displaced during the film sticking process. The positioning notch and the pulling notch are respectively provided at two opposite sides of the limiting frame, the positioning notch and the pulling notch can limit the screen protection film, thus ensuring the installation stability of the screen protection film, and the pulling notch can facilitate the sliding of the hand-tearing tension strap.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those of ordinary skill in the art.

Figure 1:
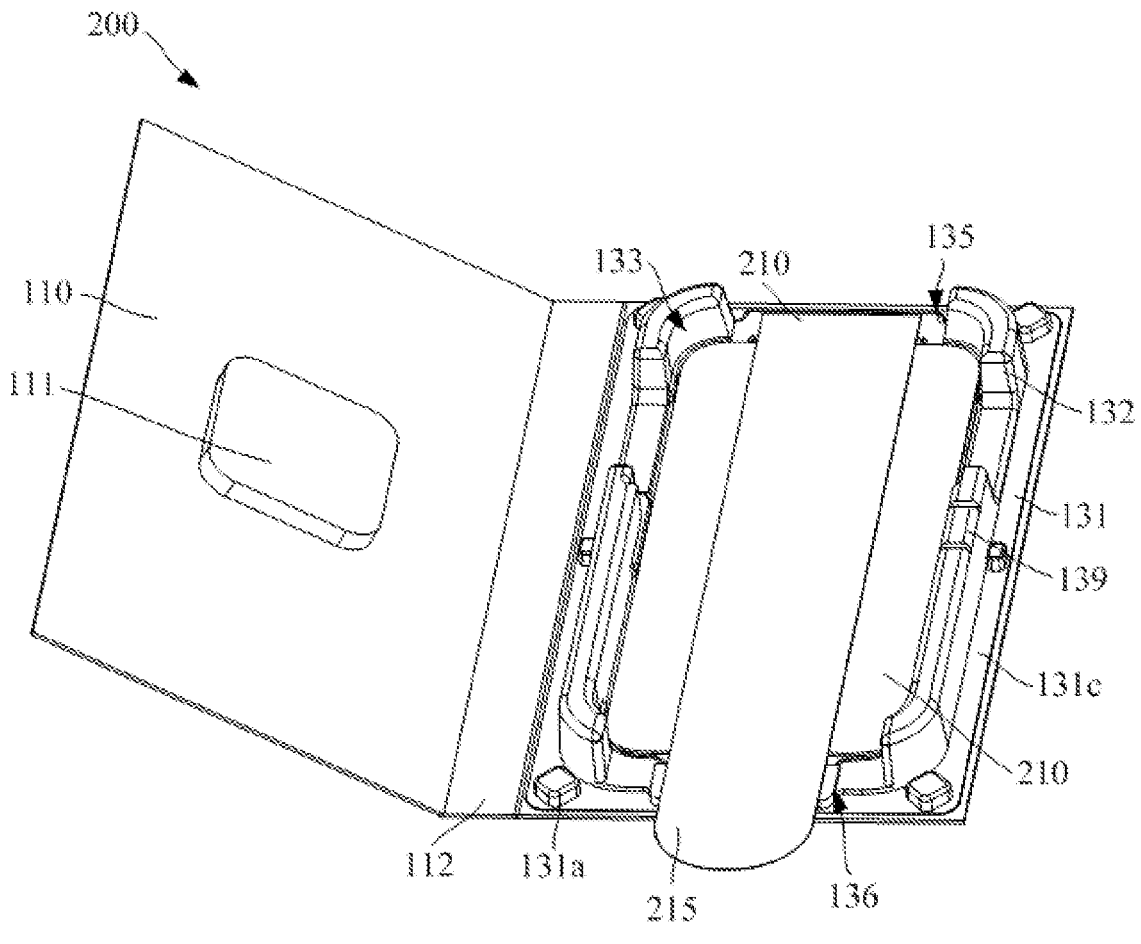
FIG. 1 is a structural schematic view of a protection film product according to the first embodiment of the present application.
Figure 2:
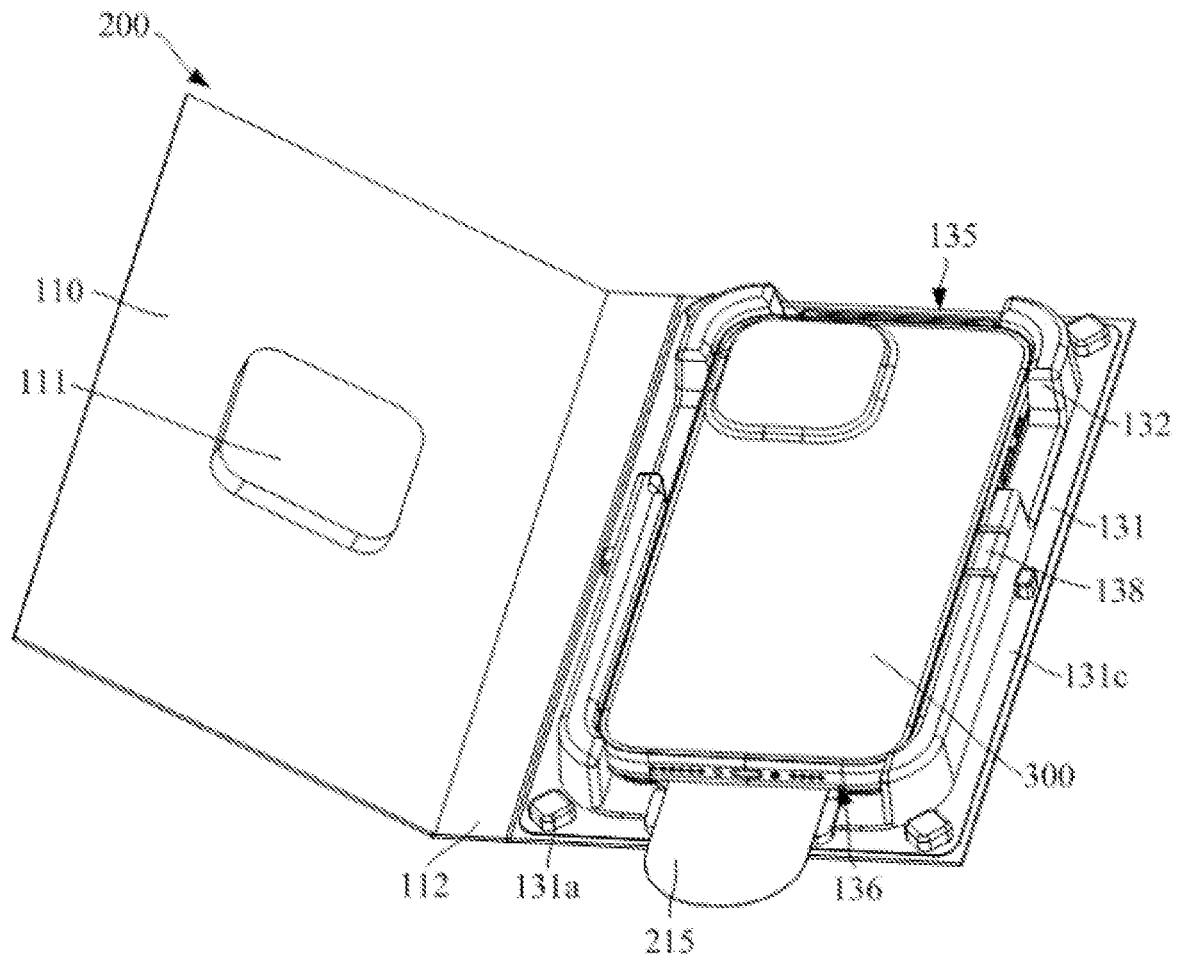
FIG. 2 is a structural schematic view of a device to be filmed is placed at the protection film product in FIG. 1.
Figure 3:
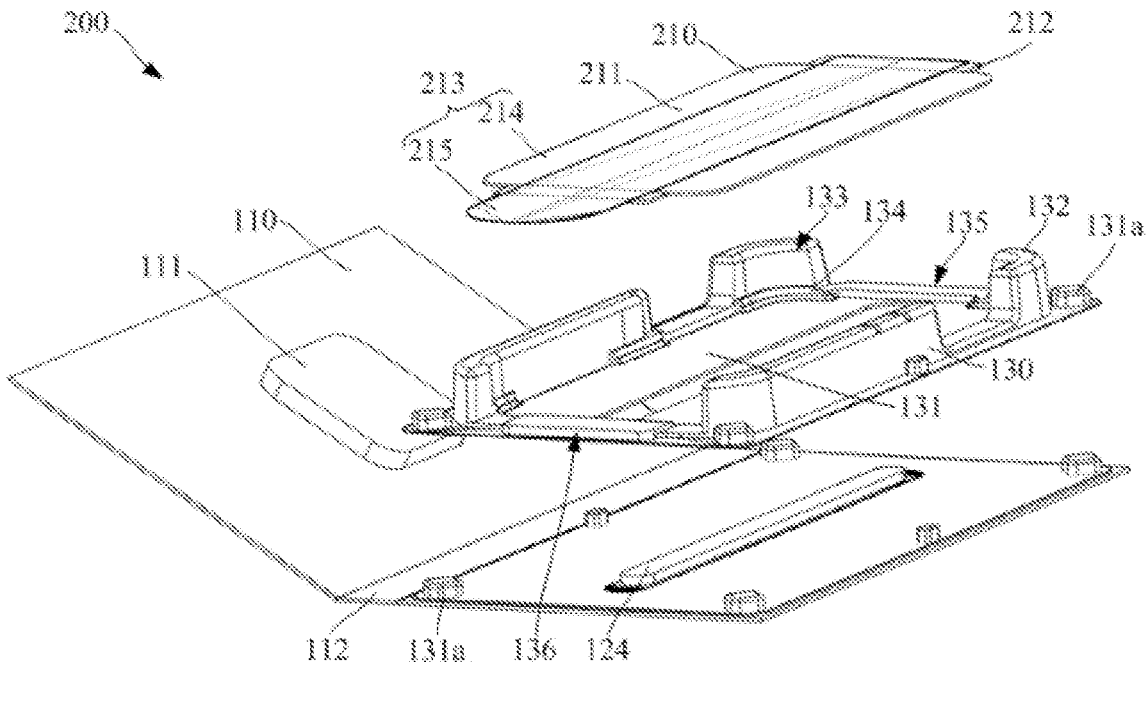
FIG. 3 is an exploded view of the protection film product in FIG. 1.

The realization of the purpose, functional features and advantages of the present application will be further described in conjunction with the embodiments and with reference to the accompanying drawings.

DETAILED DESCRIPTION OF THE EMBODIMENTS

The technical solutions in the embodiments of the present application will be clearly and completely described below in conjunction with the accompanying drawings in the embodiments of the present application. Obviously, the described embodiments are only some of the embodiments of the present application, but not all of the embodiments. Based on the embodiments of the present application, all other embodiments obtained by those of ordinary skill in the art without any creative work fall within the scope of the present application.

It should be noted that, if there are directional instructions (such as up, down, left, right, front, back or the like) involved in the embodiments of the present application, the directional indications are only used to explain the relative positional relationship, movement and so on between various components in a specific posture as shown in the accompanying drawings. If the specific posture changes, the directional indication will also change accordingly.

In addition, if there are descriptions involving "first", "second" or the like, the descriptions of "first", "second" or the like are only for descriptive purposes and cannot be understood as indicating or implying the relative importance or implicitly indicating the quantity of the technical features indicated. Therefore, features defined as "first" and "second" may explicitly or implicitly include at least one of these features. In addition, the meaning of "and/or" appearing in the entire text includes three parallel solutions, taking "A and/or B" as an example, it includes solution A, or solution B, or a solution that satisfies both A and B at the same time. In addition, the technical solutions of various embodiments can be combined with each other, but it is based on that those of ordinary skill in the art can realize. When the combination of technical solutions is contradictory or cannot be realized, it should be considered that such combination of technical solutions does not exist and is not within the protection scope claimed by the present application.

In order to protect the screens of mobile terminal devices such as mobile phones and tablet computers and ensure that the screen is not scratched during use, a screen protection film 210 is usually attached to the screen to protect the screen. However, sticking the film requires certain skills, sticking the screen protection film at one time often requires extensive film sticking experience, otherwise it will be difficult to ensure that blisters will not occur or the film may be applied crookedly, even the surface of the screen protection film 210 may be uneven, thus resulting in the need for multiple adjustments and repeated attachments, which not only easily causes the entire screen protection film 210 to be scrapped, but is also time-consuming and labor-intensive. Therefore, it is often necessary to use a film sticking device to assist the film sticking to improve the success rate of film sticking. However, the inner tray 130 in the film sticking device 100, which is configured to limit the placement location of the screen protection film 210 and the mobile terminal, is prone to deformation, thus causing the entire film sticking device 100 to be scrapped, causing that when users need to stick the film again, users often need to purchase the film sticking device 100 or repurchase the screen protection film 210 to obtain the film sticking device 100, thereby resulting in an increase in the user's cost of sticking the film.

In view of this, the present application proposes a film sticking device 100. The film sticking device 100 is configured to stick a film on the screen of a device to be filmed 300. The device to be filmed 300 can be a mobile terminal device with a specific shape such as a mobile phone or a tablet computer. The screen protection film 210 applied is often a tempered film, and certainly it can also be a hydrogel film.

In the embodiment of the present application, as shown in FIG. 1 to FIG. 15, the film sticking device 100 includes an upper cover 110, a base 120 and an inner tray 130. The upper cover 110 is movably connected to a side of the upper cover 120. The inner tray 130 includes a chassis 131 and a limiting frame 132 provided at the chassis 131, the limiting frame 132 encloses a receiving groove 133 on the chassis 131, an inner wall of the limiting frame 132 is provided with a limiting step 134 configured for installing a screen protection film 210, and a positioning notch 135 and a pulling notch 136 are respectively provided at two opposite sides of the limiting frame 132. The inner tray 130 is detachably installed at a side of the base 120 facing the upper cover 110, and the upper cover 110 is configured to cover the receiving groove 133.

Specifically, the upper cover 110 is movably connected to the side of the base 120, that is, the upper cover 110 can be rotationally connected to one side of the base 120, or the upper cover 110 and the base 120 can be provided to be separated. The inner tray 130 is provided at the side of the base 120 facing the upper cover 110, and the opening of the receiving groove 133 of the inner tray 130 is provided away from the base 120. When the film sticking device 100 is opened, the upper cover 110 does not cover the receiving groove 133 for the device to be filmed 300 to be placed at the preset position, so that the screen of the device to be filmed 300 is aligned with the screen protection film 210 (at this time, there is a small gap or contact between the screen and the screen protection film 210); then the upper cover 110 covers with the receiving groove 133, the user presses the base 120 and the upper cover 110 to make the screen abut against the screen protection film 210, and at the same time tearing off the protective layer 214 on the screen protection film 210 by the hand-tearing tension strap 215, (it can also tear off the protective layer 214 on the screen protection film 210 by hand-tearing tension strap 215 firstly, then press the base 120 and the upper cover 110 to make the screen abut against the screen protection film 210), thereby achieving fast and accurate film sticking. Since the inner tray 130 is easily deformed during use, the inner tray 130 is a consumable item. The inner tray 130 can be detachably installed on the side of the base 120 facing the upper cover 110, thereby facilitating the replacement of the inner tray 130. When the film needs to be attached again, the user can choose to directly replace the inner tray 130 without replacing the entire film sticking device 100, thereby reducing the user's film sticking cost.

Refer to FIG. 1 to FIG. 4 and FIG. 7, the upper cover 110 can be connected to the long side of the base 120 (the side extending along the upper and lower directions). Referring to FIG. 8 to FIG. 11, the upper cover 110 can also be connected to the short side of the base 120 (the side at an angle with the long side).

Figure 15:
FIG. 15 is an internal structural schematic view of the protection film product in FIG. 12 from another perspective.
Figure 15:
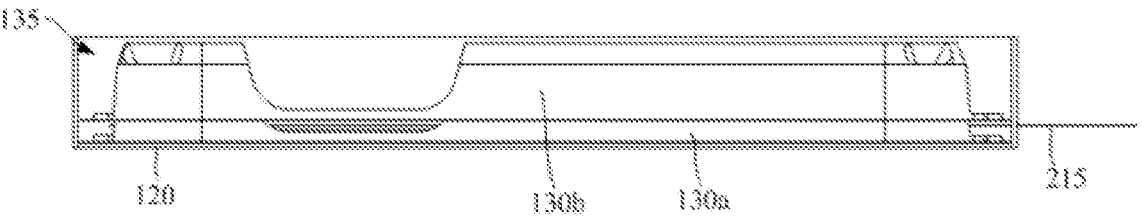
Figure 16:
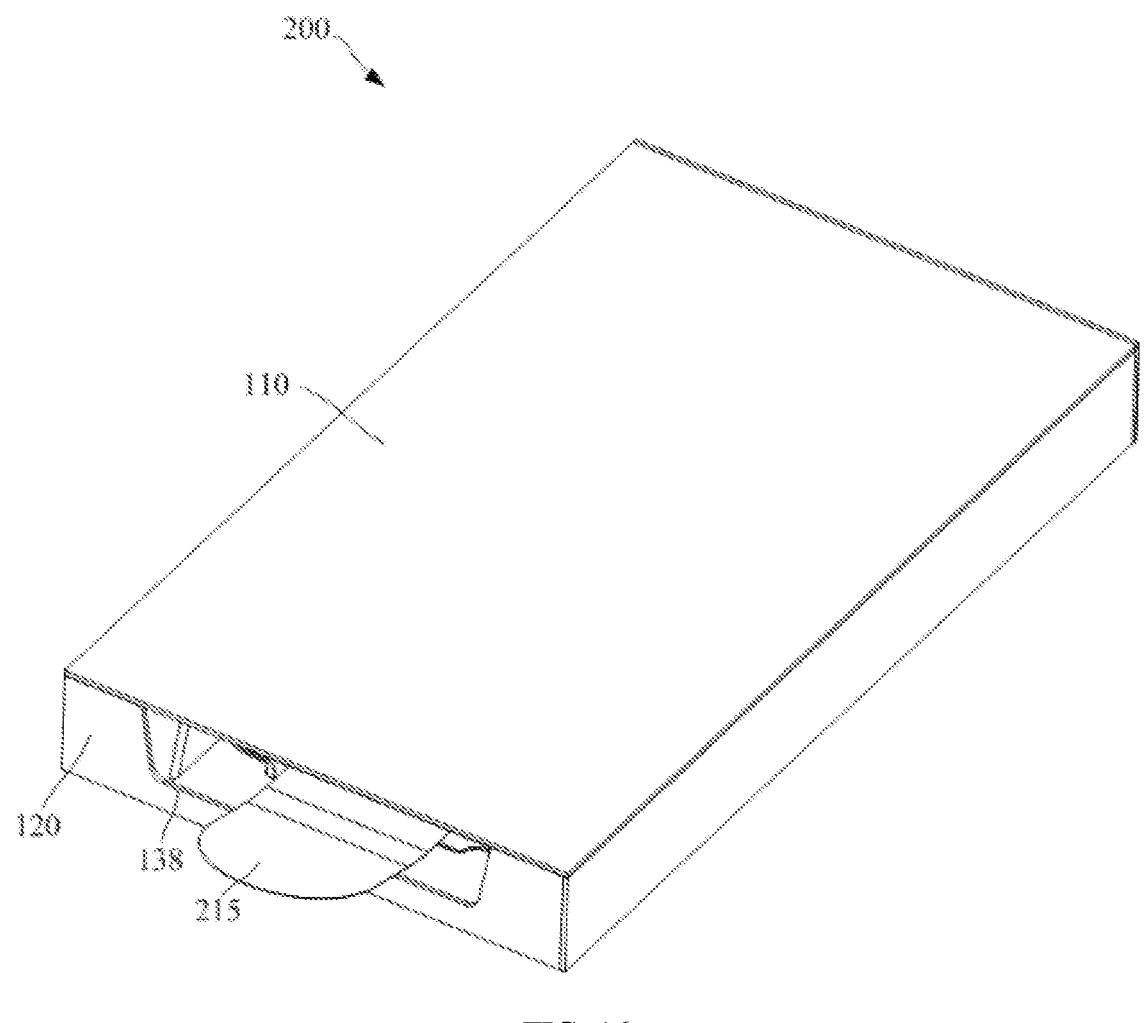
FIG. 16 is a structural schematic view of a protection film product according to the seventh embodiment of the present application.
Figure 17:
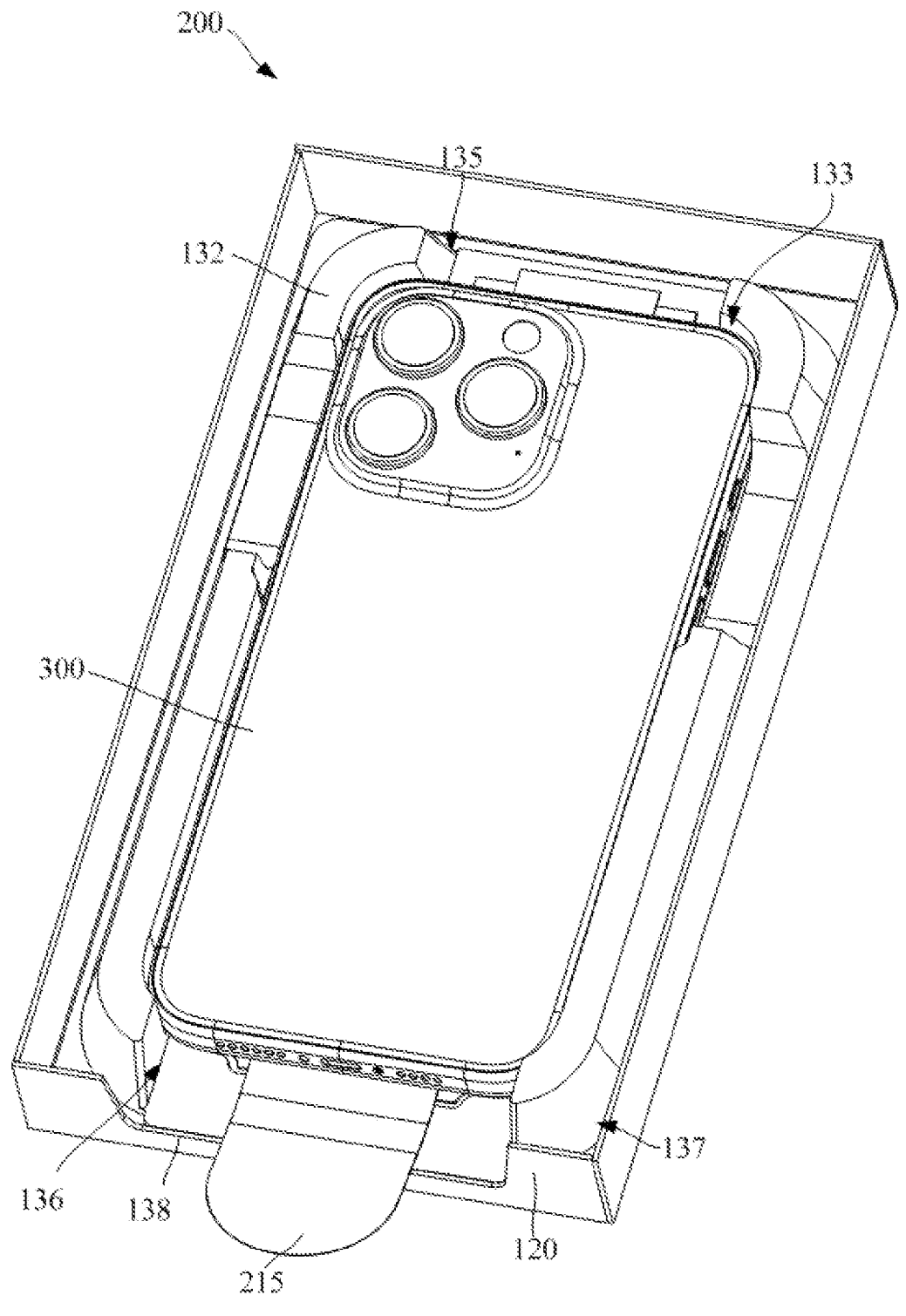
FIG. 17 is a structural schematic view of a device to be filmed is placed at the protection film product in FIG. 16.

According to the needs of different users, only one inner tray 130 or multiple inner trays 130 can be provided in each film sticking device 100. When a film sticking device 100 is equipped with multiple inner trays 130, that is, in addition to one inner tray 130 fixed on the base 120, the film sticking device 100 further includes at least another inner tray 130, thereby facilitating the user to replace the inner tray 130 in time without the need to purchase multiple times. Moreover, the models of the multiple inner trays 130 can be the same, or some parts of the models of the multiple inner trays 130 can be the same and the other parts different, or different settings, so that one film sticking device 100 can satisfy the film sticking of multiple different models or sizes of device to be filmed 300, further reducing the user's film sticking cost. Referring to FIG. 15, multiple inner trays 130 can be provided to be stacked to facilitate the storage and packaging of the film sticking device 100 and reduce the space occupied by the film sticking device 100. Assume that two inner trays 130 are provided in the film sticking device 100, and the two inner trays 130 are configured as a first inner tray 130a and a second inner tray 130b, the bottom of the second inner tray 130b is provided with a slot for the first inner tray 130a to be plugged into (that is, the bottom of the limiting frame 132 of the second inner tray 130b is provided to be hollow), so that the first inner tray 130a and the second inner tray 130b partially overlap in the thickness direction, thereby reducing the total thickness of multiple inner trays 130 and reducing the overall volume of the film sticking device 100. When the first inner tray 130a and the second inner tray 130b are nested with each other, the bottom of the second inner tray 130b abuts against the limiting step 134 in the first inner tray 130a, therefore, the second inner tray 130b is not completely set on the first inner tray 130a.

Since the film sticking device 100 is often sold as a bonus together with the screen protection film 210, the number of the inner tray 130 can be consistent with the number of the screen protection film 210. In an embodiment, the film sticking device 100 includes at least one screen protection film 210 and at least one inner tray 130, each screen protection film 210 is correspondingly provided at one inner tray 130, thereby reducing the process for users to manually place the screen protection film 210.

Moreover, in an embodiment, the screen protection film 210 includes a film body 211, a first release film 212 and a second release film 213, the first release film 212 and the second release film 213 are respectively attached to two opposite sides of the film body 211; two opposite ends of the first release film 212 extend outward from the film body 211 to the positioning notch 135 and the pulling notch 136 respectively, the second release film 213 includes a protective layer 214 and a hand-tearing tension strap 215, the protective layer 214 is attached to a surface of the film body 211, and a part of the hand-tearing tension strap 215 adjacent to the positioning notch 135 is connected to the protective layer 214 and extends toward the pulling notch 136 and out of the receiving groove 133.

The inner tray 130 includes a chassis 131 and a limiting frame 132 provided at the chassis 131, the limiting frame 132 encloses a receiving groove 133 on the chassis 131, the receiving groove 133 can be configured for placing the device to be filmed 300 and screen protection film 210, thereby positioning the device to be filmed 300 and the screen protection film 210. Moreover, the inner wall of the limiting frame 132 is provided with a limiting step 134 for installing the screen protection film 210, thereby further fixing the screen protection film 210, and reducing the possibility of the screen protection film 210 being displaced during the film sticking process. Along the upper and lower directions of the inner tray 130, the upper side of the limiting frame 132 (the upper side of the device to be filmed 300) is provided with a positioning notch 135, and the lower side (the lower side of the device to be filmed 300) is provided with a pulling notch 136, two opposite ends of the first release film 212 extend outward from the film body 211 to the positioning notch 135 and the pulling notch 136 respectively, the extended part of the first release film 212 can be bonded to the positioning notch 135 and the pulling notch 136, thereby limiting the screen protection film 210, ensuring the installation stability of the screen protection film 210, and facilitating the sliding of the hand-tearing tension strap 215. After the film sticking is completed, taking out the device to be filmed 300 and directly tearing off the first release film 212.

The positioning notch 135 can be provided at the entire short side of the receiving groove 133, or can be provided at part of the short side of the receiving groove 133. The pulling notch 136 can be provided at the entire short side of the receiving groove 133, or can be provided at part of the short side of the receiving groove 133.

In an embodiment, the limiting step 134 is supported at an edge of the screen protection film 210 and allows the screen protection film 210 to be spaced apart from the chassis 131, thereby reducing the possibility that after the film sticking is completed, the first release film 212 adhered to the chassis 131 during the removal process and thus causing the screen protection film 210 to accidentally lift up.

Figure 4:
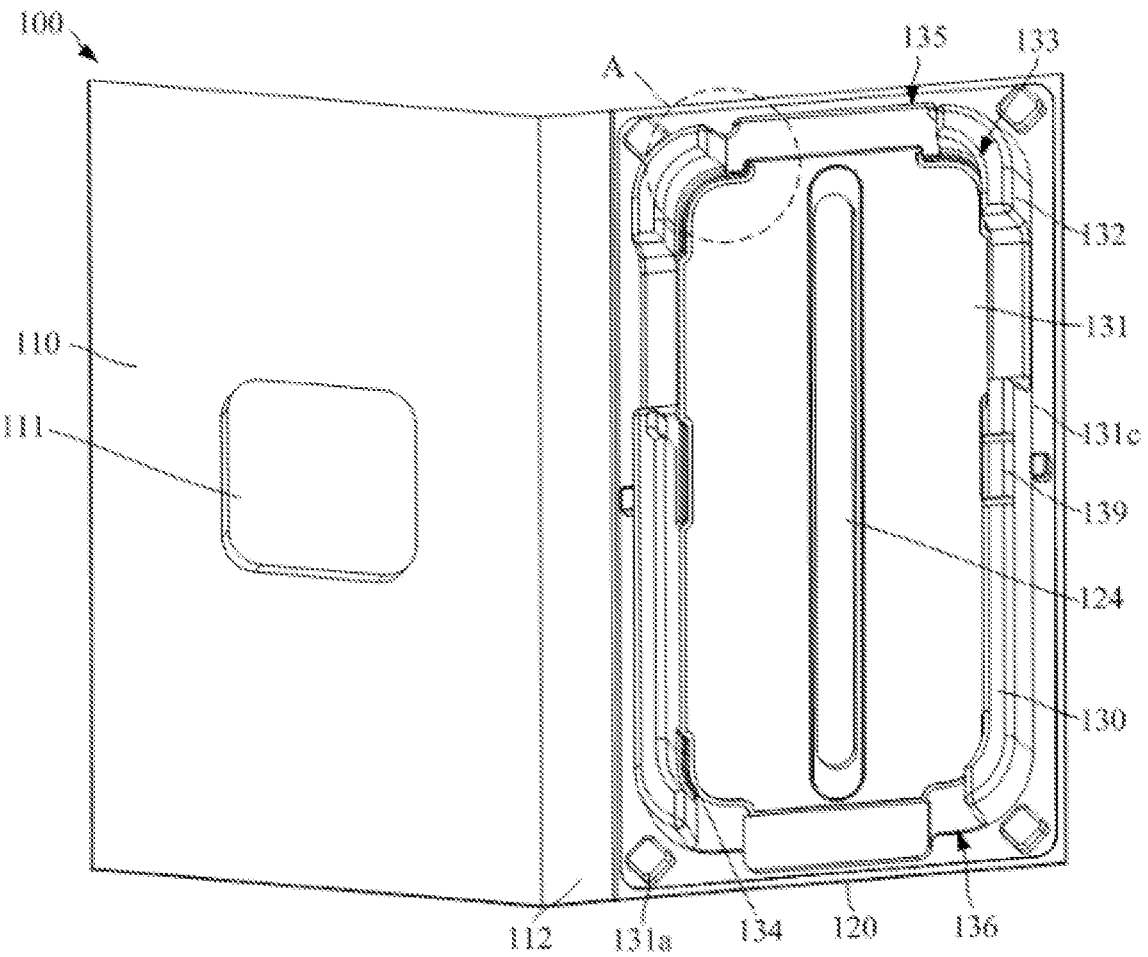
FIG. 4 is a structural schematic view of the film sticking device in FIG. 1.
Figure 5:
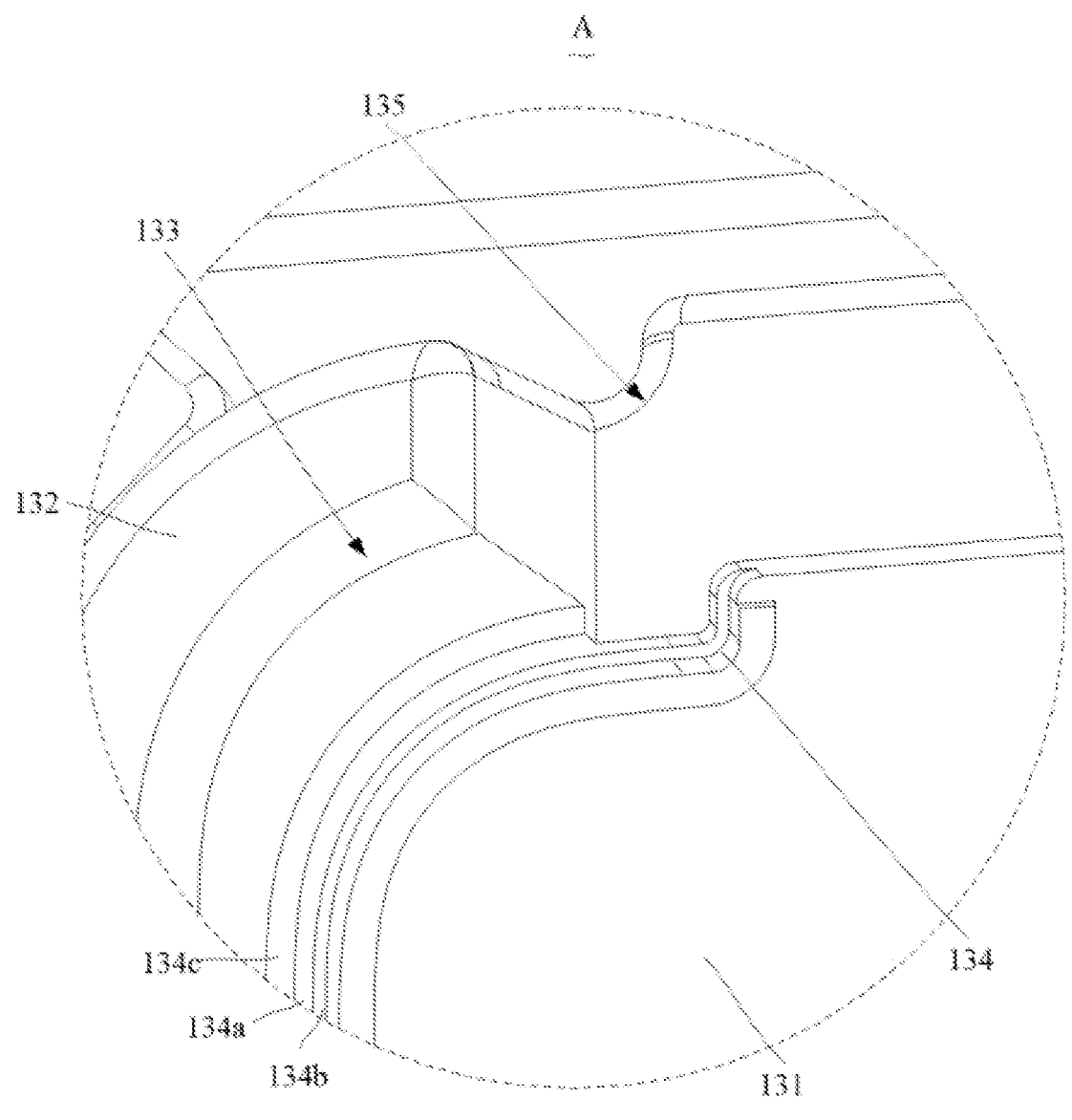
FIG. 5 is a partial enlarged view of A in FIG. 4.
Figure 6:
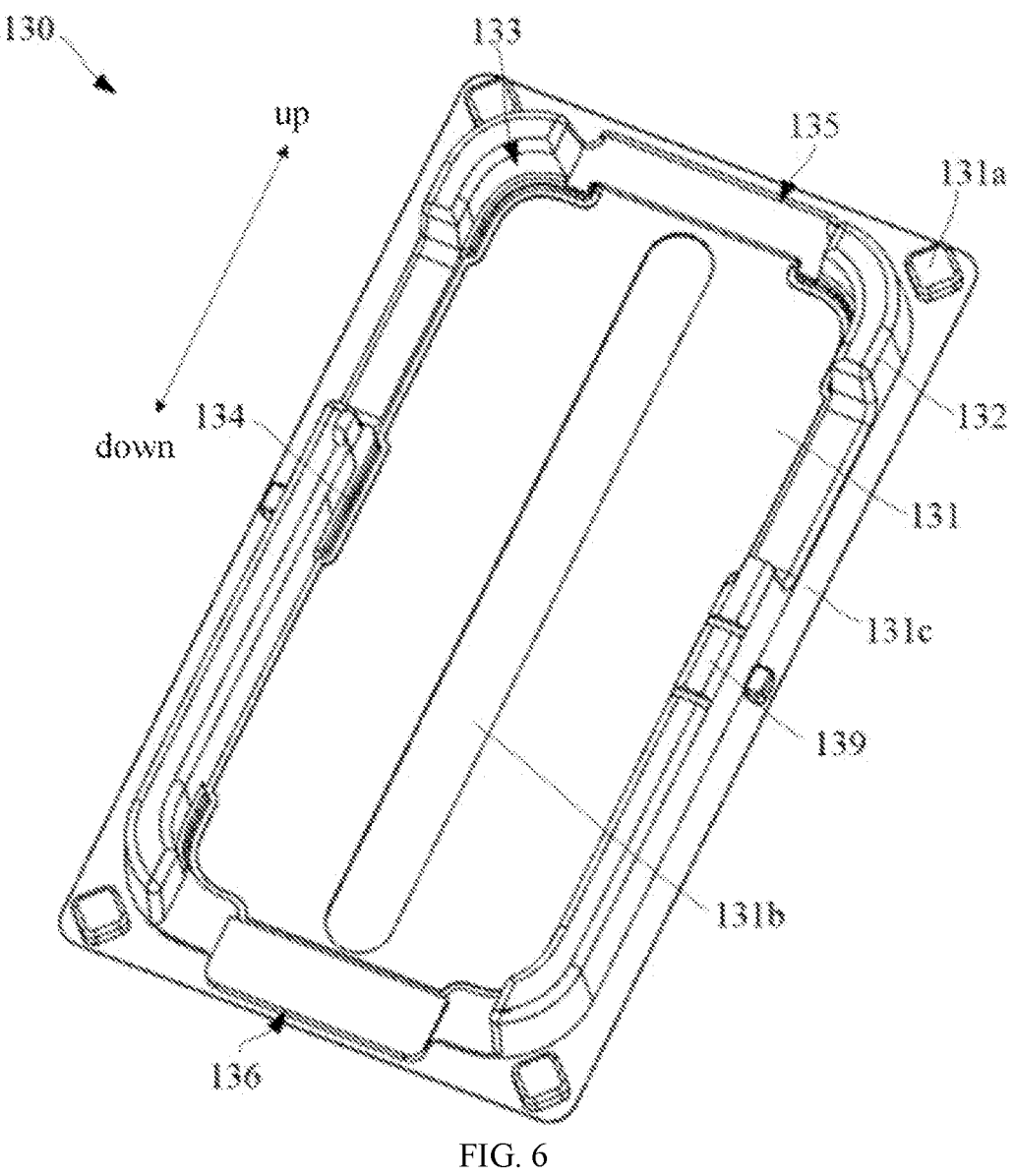
FIG. 6 is a structural schematic view of the inner tray in FIG. 1.

Referring to FIG. 4 to FIG. 6, in an embodiment, the limiting step 134 includes a limiting surface 134*a* and an abutting surface 134*b* provided at an angle with the limiting surface 134*a*, the limiting surface 134*a* faces a side wall of the receiving groove 133, and the abutting surface 134*b* faces an opening of the receiving groove 133 to support the screen protection film 210. The limiting surface 134*a* is provided around the periphery of the screen protection film 210 to limit position for the installation of the screen protection film 210, the abutting surface 134*b* faces the opening of the receiving groove 133, thereby supporting the screen protection film 210, so that the screen protection film 210 and the chassis 131 are provided at intervals.

Furthermore, a supporting surface 134*c* is provided above the limiting surface 134*a*, the supporting surface 134*c* faces the opening of the receiving groove 133 to support the device to be filmed 300. Moreover, the distance between the supporting surface 134*c* and the abutting surface 134*b* is greater than or equal to the thickness of the screen protection film 210, so that before the film sticking action is performed, there is no mutual squeezing effect between the screen and the screen protection film 210.

In an embodiment, the abutting surface 134*b* is flush with a bottom surface of the positioning notch 135, thereby ensuring the stability of placement of the screen protection film 210. Certainly, in other embodiments, the abutting surface 134*b* may also be slightly higher than the bottom surface of the positioning notch 135, or the abutting surface 134*b* may be slightly lower than the bottom surface of the positioning notch 135. In an embodiment, the distance between the abutting surface 134*b* and the bottom surface of the positioning notch 135 is smaller than the distance between the supporting surface 134*c* and the abutting surface 134*b*.

In order to improve the cover stability of the upper cover 110, in an embodiment, a first magnetic attraction portion 139 is provided at a side of the limiting frame 132 close to the upper cover 110, a second magnetic attraction portion is provided corresponding to the upper cover 110; when the upper cover 110 covers the receiving groove 133, the first magnetic attraction portion 139 and the second magnetic attraction portion are magnetically connected.

When the inner tray 130 is detachably installed on the base 120, in an embodiment, referring to FIG. 1 to FIG. 8, the inner tray 130 is snap-connected to the base 120. That is, a snap-in structure is provided between the inner tray 130 and the base 120, thereby facilitating the disassembly and installation of the inner tray 130.

Furthermore, the chassis 131 is provided with an installing skirt edge 131*c* on an outside of the limiting frame 132, and the installing skirt edge 131*c* is snap-connected to the base 120. Specifically, the installing skirt edge 131*c* is provided around the outer periphery of the limiting frame 132, by allowing the installing skirt edge 131*c* to be snap-connected to the base 120, it can facilitate the assembly of the inner tray 130 and also reduce the impact of the snap-in structure on the limiting frame 132 structure.

The snap-in structure includes a snapping protrusion 121 provided at one of the installing skirt edge 131*c* and the base 120, and a snapping groove 131*a* provided at the other one of the installing skirt edge 131*c* and the base 120. When the installing skirt edge 131*c* is installed at the base 120, the snapping protrusion 121 is snap-connected to the snapping groove 131*a*. Certainly, in other embodiments, the snap-in structure can also be configured as two buckles. In other embodiments, the snap-in structure may be provided between the limiting frame 132 and the base 120.

Figure 7:
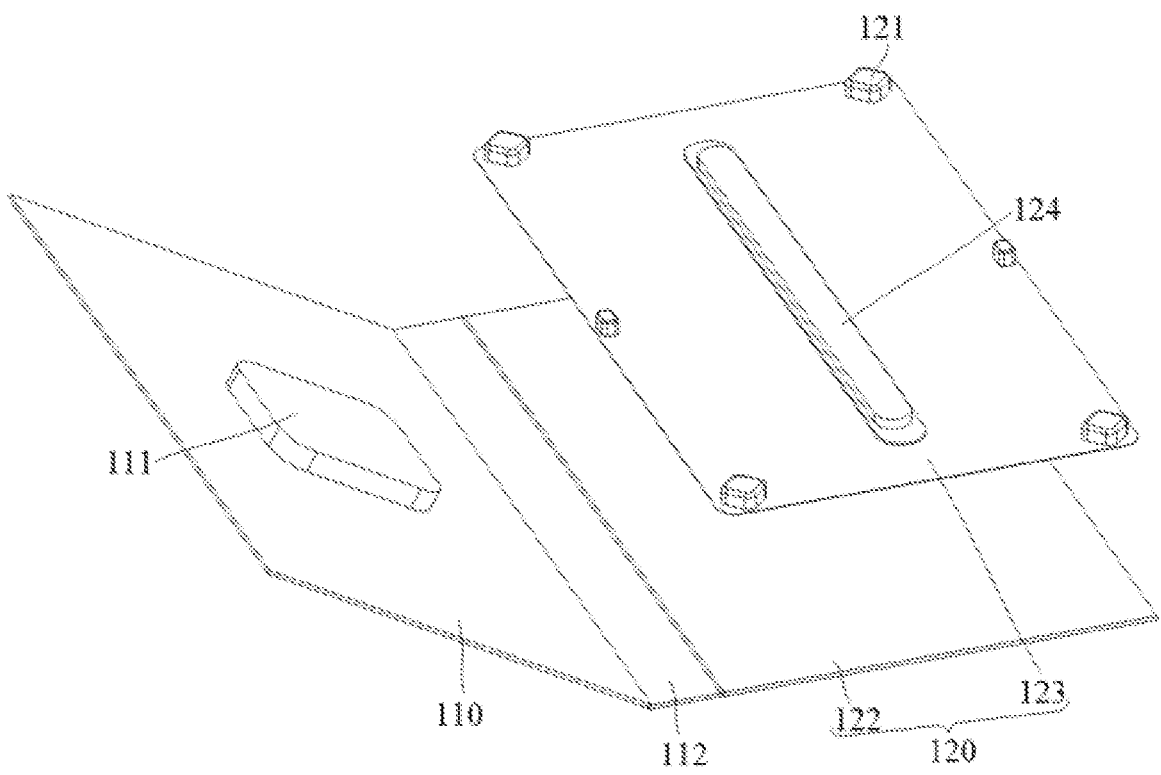
FIG. 7 is an exploded view of the base in FIG. 1.
Figure 8:
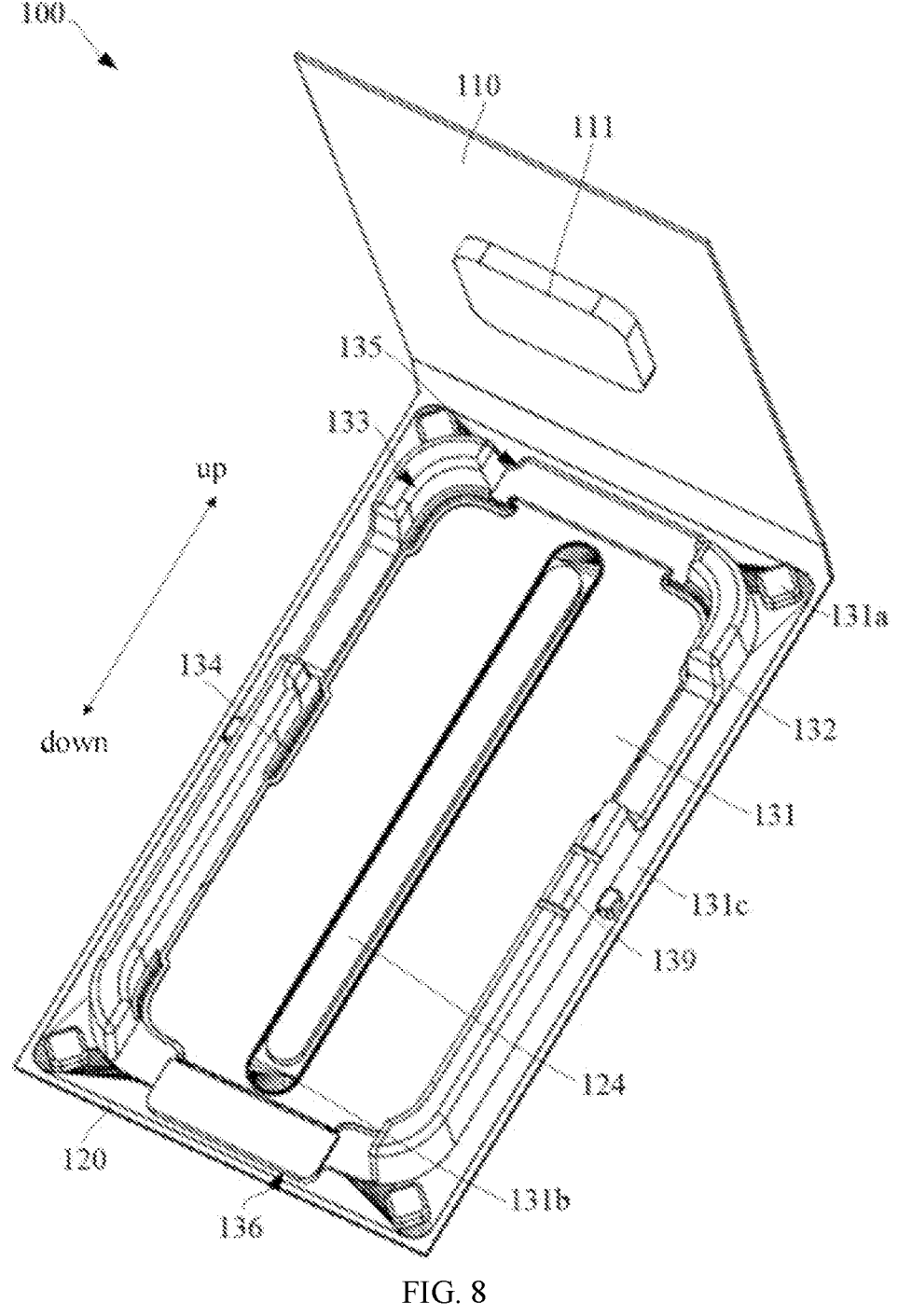
FIG. 8 is a structural schematic view of a film sticking device in a protection film product according to the second embodiment of the present application.

In order to facilitate the processing of the base 120, refer to FIG. 7, the base 120 includes a baseplate 122 and a snapping plate 123 fixed on the baseplate 122, the snapping plate 123 is fixed at a side of the baseplate 122 facing the upper cover 110, and the chassis 131 is snap-connected to the snapping plate 123. Specifically, the base 120 is configured as a plate structure, the snapping plate 123 is configured for snap-connecting with the chassis 131, the baseplate 122 is configured for rotationally connecting with the upper cover 110, thereby facilitating the processing of the base 120. The snapping plate 123 is fixed to the baseplate 122, for example, the snapping plate 123 can be directly bonded or riveted to fix on baseplate 122, or can be fixed on the baseplate 122 by fasteners or connectors. In other embodiments, the snapping plate 123 and the baseplate 122 are integrally formed. In order to facilitate the rotation of the upper cover 110, one side of the upper cover 110 is bent and connected with a connecting plate 112, another side of the connecting plate 112 is bent and connected to the baseplate 122, thereby facilitating the opening and closing of the upper cover 110.

When the base 120 is snap-connected to the inner tray 130, in an embodiment, refer to FIG. 1 to FIG. 8, a first compacting protrusion 111 is provided at a side of the upper cover 110 facing the inner tray 130; a second compacting protrusion 124 is provided at a side of the base 120 facing the inner tray 130, a through hole 131b is provided on the chassis 131, and the second compacting protrusion 124 passes through the through hole 131b and extends into the receiving groove 133.

Specifically, the first compacting protrusion 111 is configured to compress the side of the device to be filmed 300 away from the screen to make the screen fit the screen protection film 210. The second compacting protrusion 124 is configured to compact the screen protection film 210 to the screen, thereby bidirectionally compressing the screen and the screen protection film 210 to reduce the generation of bubbles. At this time, the second compacting protrusion 124 is provided at the base 120, the through hole 131b is provided on the chassis 131, the second compacting protrusion 124 passes through the through hole 131b and extends into the receiving groove 133, thereby, the second compacting protrusion 124 can further position the inner tray 130 when the inner tray 130 is installed at the base 120 while compressing the screen protection film 210 at the screen.

The first compacting protrusion 111 and the second compacting protrusion 124 are configured as flexible parts such as cotton slivers, cotton blocks, rubber blocks or the like, which can not only provide a buffer for the fit between the screen and the screen protection film 210, but also reduce the possibility that the first compacting protrusion 111 scratches the surface of the device to be filmed 300 and the first compacting protrusion 111 scratches the screen protection film 210. Moreover, the second compacting protrusion 124 extends along the long side of the inner tray 130, thereby increasing the effective length of the second compacting protrusion 124 on the screen protection film 210 to eliminate bubbles. Moreover, in an embodiment, the first compacting protrusion 111 and/or the second compacting protrusion 124 should be provided close to the middle of the inner tray 130.

Figure 9:
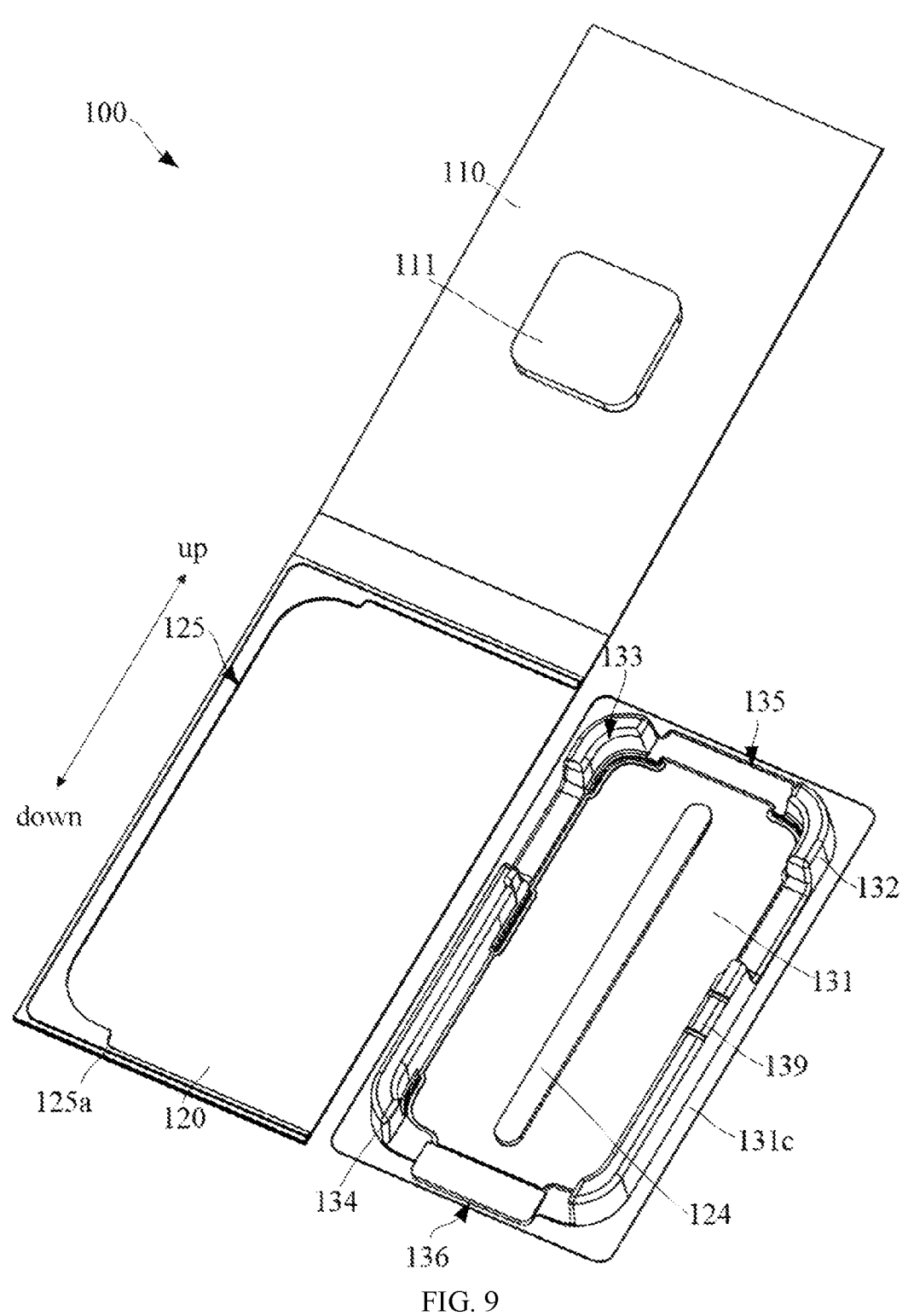
FIG. 9 is a structural schematic view of a film sticking device in a protection film product according to the third embodiment of the present application.
Figure 10:
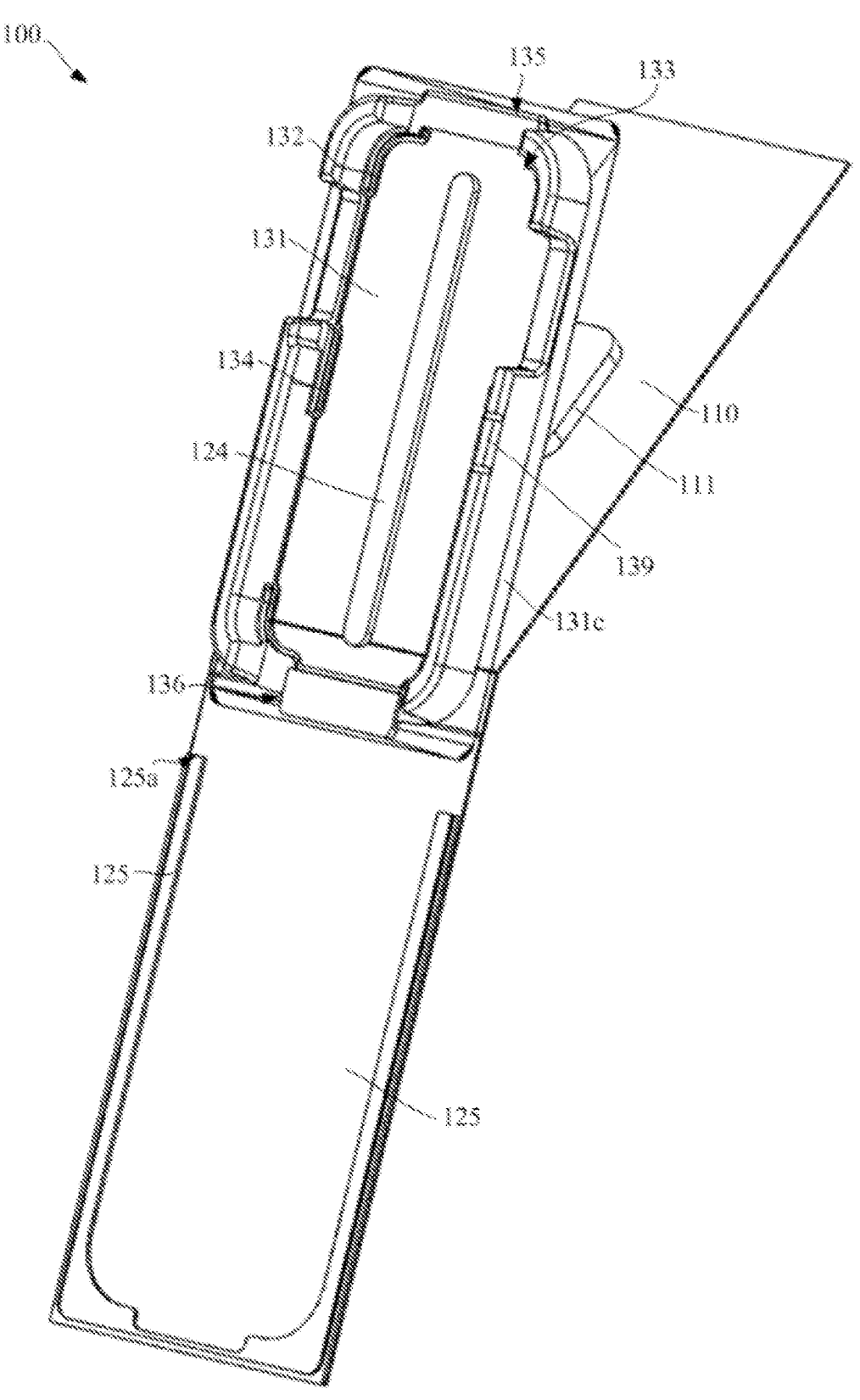
FIG. 10 is a structural schematic view of a film sticking device in a protection film product according to the fourth embodiment of the present application.

When the inner tray 130 is detachably installed on the base 120, in another embodiment, refer to FIG. 9 and FIG. 10, the chassis 131 is provided with an installing skirt edge 131c at an outside of the limiting frame 132, a limiting groove 125 is formed at a periphery of the base 120, the limiting groove 125 is configured to prevent the inner tray 130 from detaching from the base 120 in a direction closer to the upper cover 110, the limiting groove 125 is provided with a pulling opening 125a at at least one side of the base 120, and the installing skirt edge 131c is inserted into the limiting groove 125 via the pulling opening 125a. Specifically, the limiting groove 125 is provided at the periphery of the base 120, the opening of the limiting groove 125 is provided at the inner peripheral side of the limiting groove 125, therefore, the groove wall of the limiting groove 125 can prevent the inner tray 130 from detaching from the base 120 in a direction closer to the upper cover 110. The pulling opening 125a is configured for installing the inner tray 130, the installing skirt edge 131c is slidably inserted into the limiting groove 125 via the pulling opening 125a, thereby completing the fixation of the inner tray 130.

The pulling opening 125a is provided at least at one side of the base 120, refer to FIG. 9, in an embodiment, the pulling opening 125a is provided at one long side of the base 120 and extends to the two short sides, the limiting groove 125 at another long side and part of the short side fixes the inner tray 130. Referring to FIG. 10, in another embodiment, the pulling opening 125a is provided at one short side of the base 120, and the limiting grooves 125 at another short side and two long sides fixes the inner tray 130.

Furthermore, the upper cover 110 is provided with a first compacting protrusion 111 at a side facing the inner tray 130; and a second compacting protrusion 124 is provided at a side of the chassis 131 facing the receiving groove 133. Specifically, when the base 120 limits the inner tray 130 by the limiting groove 125, in order to reduce the second compacting protrusion 124 from blocking the sliding of the inner tray 130, the second compacting protrusion 124 can be directly provided on the chassis 131.

Figure 11:
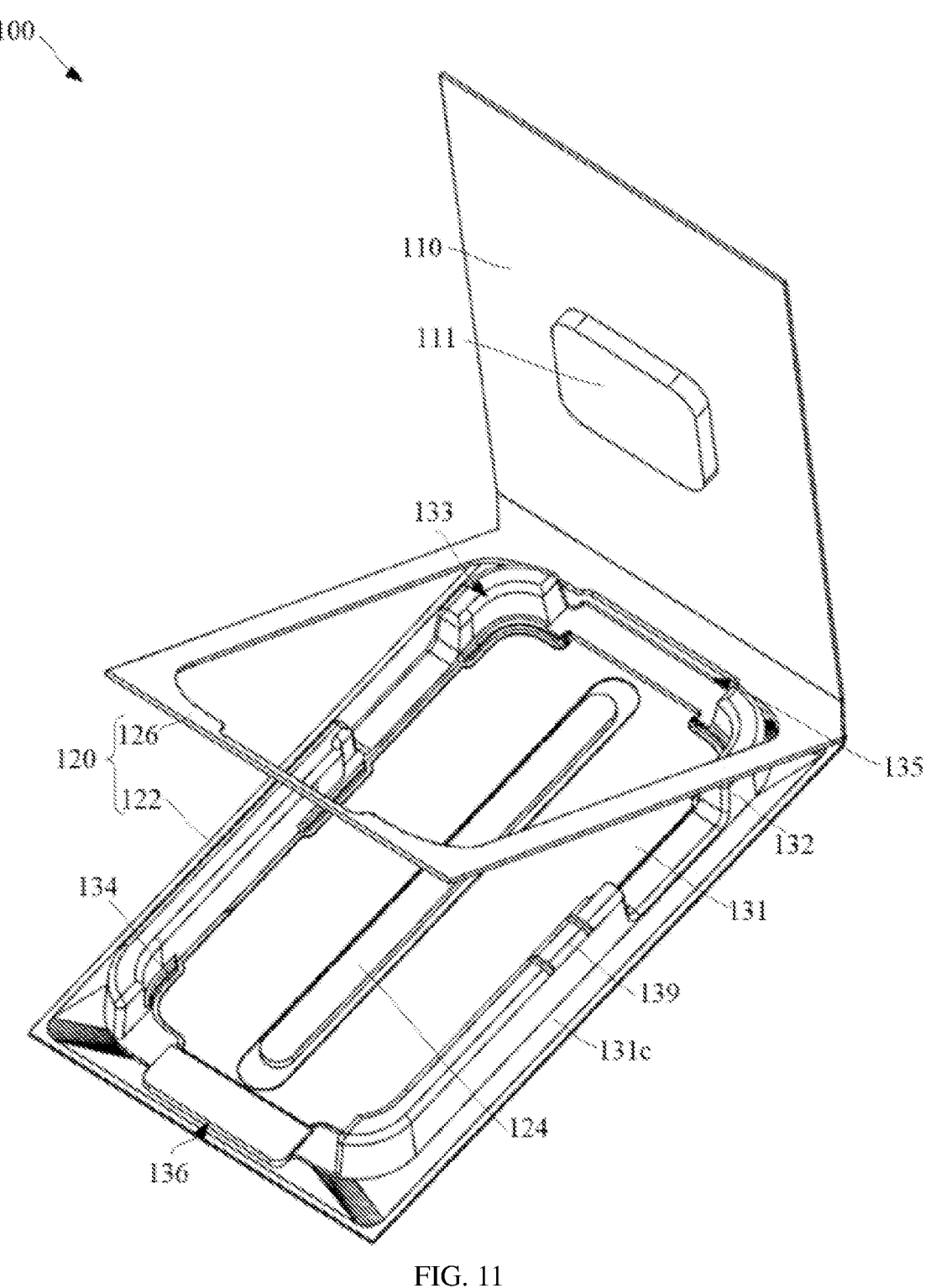
FIG. 11 is a structural schematic view of a film sticking device in a protection film product according to the fifth embodiment of the present application.

When the inner tray 130 is detachably installed on the base 120, in another embodiment, referring to FIG. 11, the chassis 131 is provided with an installing skirt edge 131c at an outside of the limiting frame 132, the base 120 further includes a baseplate 122 and a pressure frame 126 movably connected to the baseplate 122, and the pressure frame 126 is configured to be sleeved on the limiting frame 132 and compress the installing skirt edge 131c to the base 120. Specifically, the base 120 is divided into two parts, the baseplate 122 configured for placing the inner tray 130 and the pressure frame 126 configured for fixing the inner tray 130, and this assembly method is more convenient for the disassembly and installation of the inner tray 130. Moreover, at this time, the baseplate 122 can be rotatably connected to the upper cover 110 by the connecting plate 112. To ensure structural integrity, one side of the pressure frame 126 can also be rotatably connected to the connecting plate 112. At this time, the second compacting protrusion 124 can be provided on the baseplate 122 or directly provided on the chassis 131.

Figure 12:
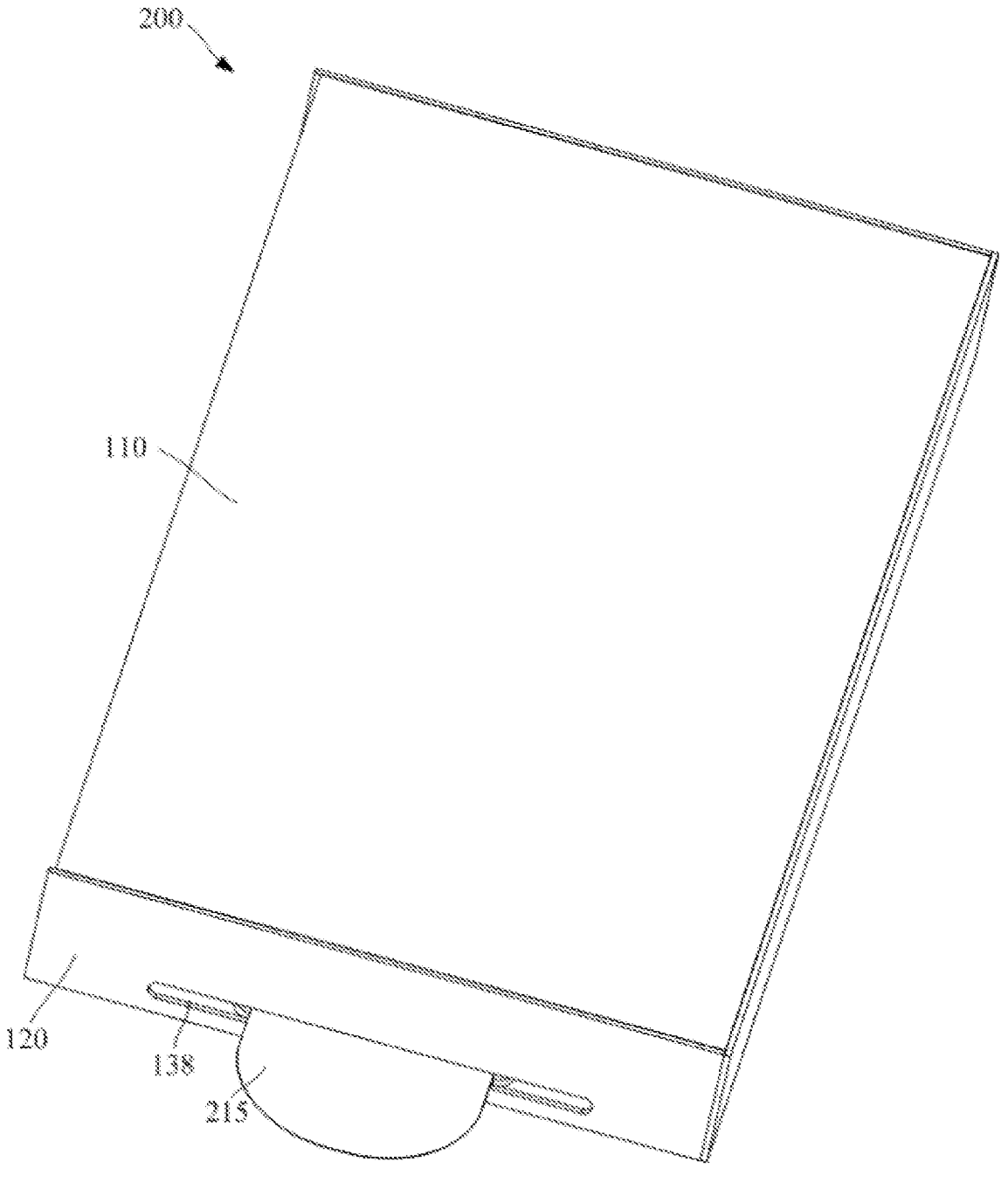
FIG. 12 is a structural schematic view of a protection film product according to the sixth embodiment of the present application.
Figure 13:
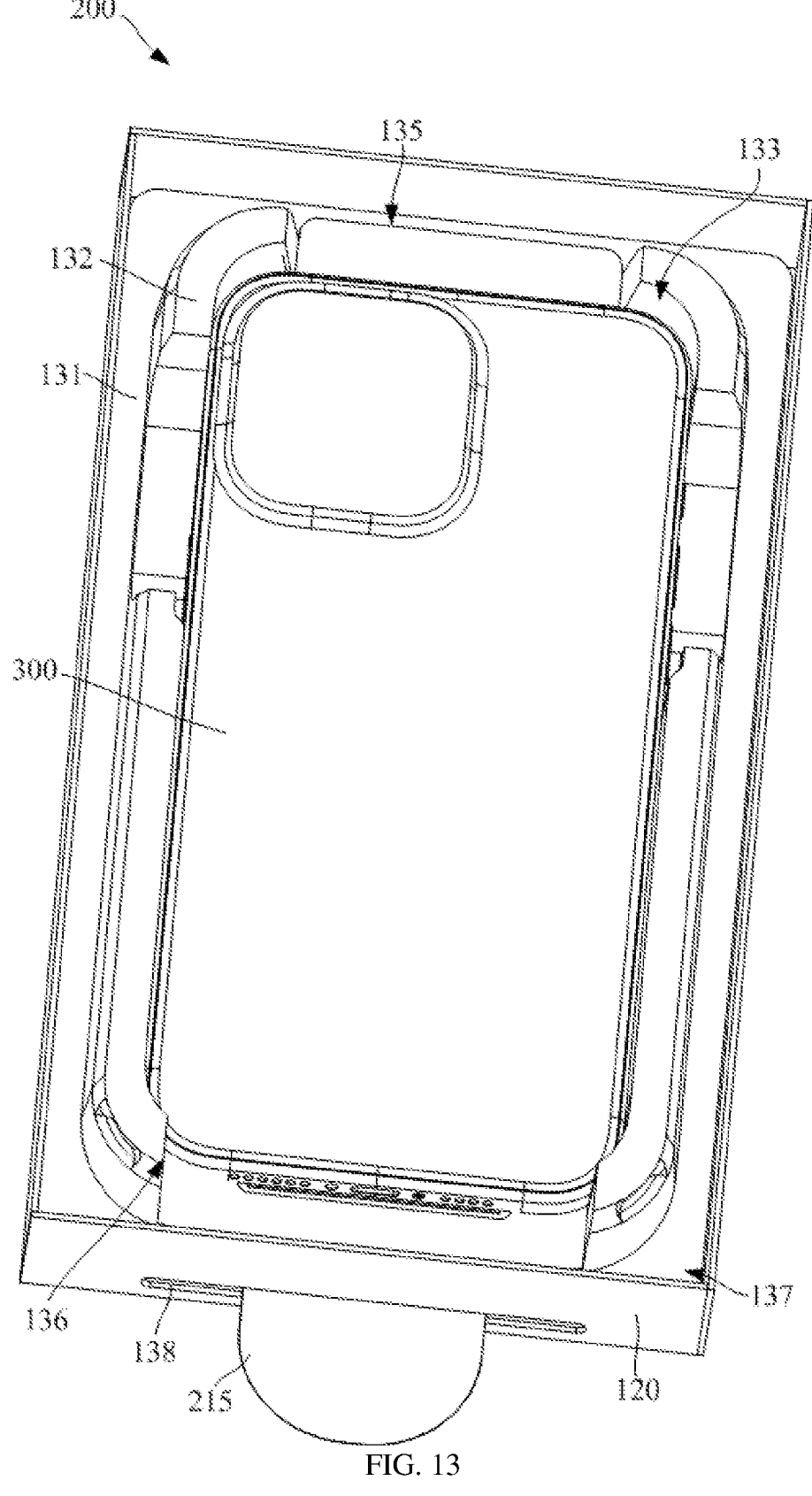
FIG. 13 is a structural schematic view of a device to be filmed is placed at the protection film product in FIG. 12.
Figure 14:
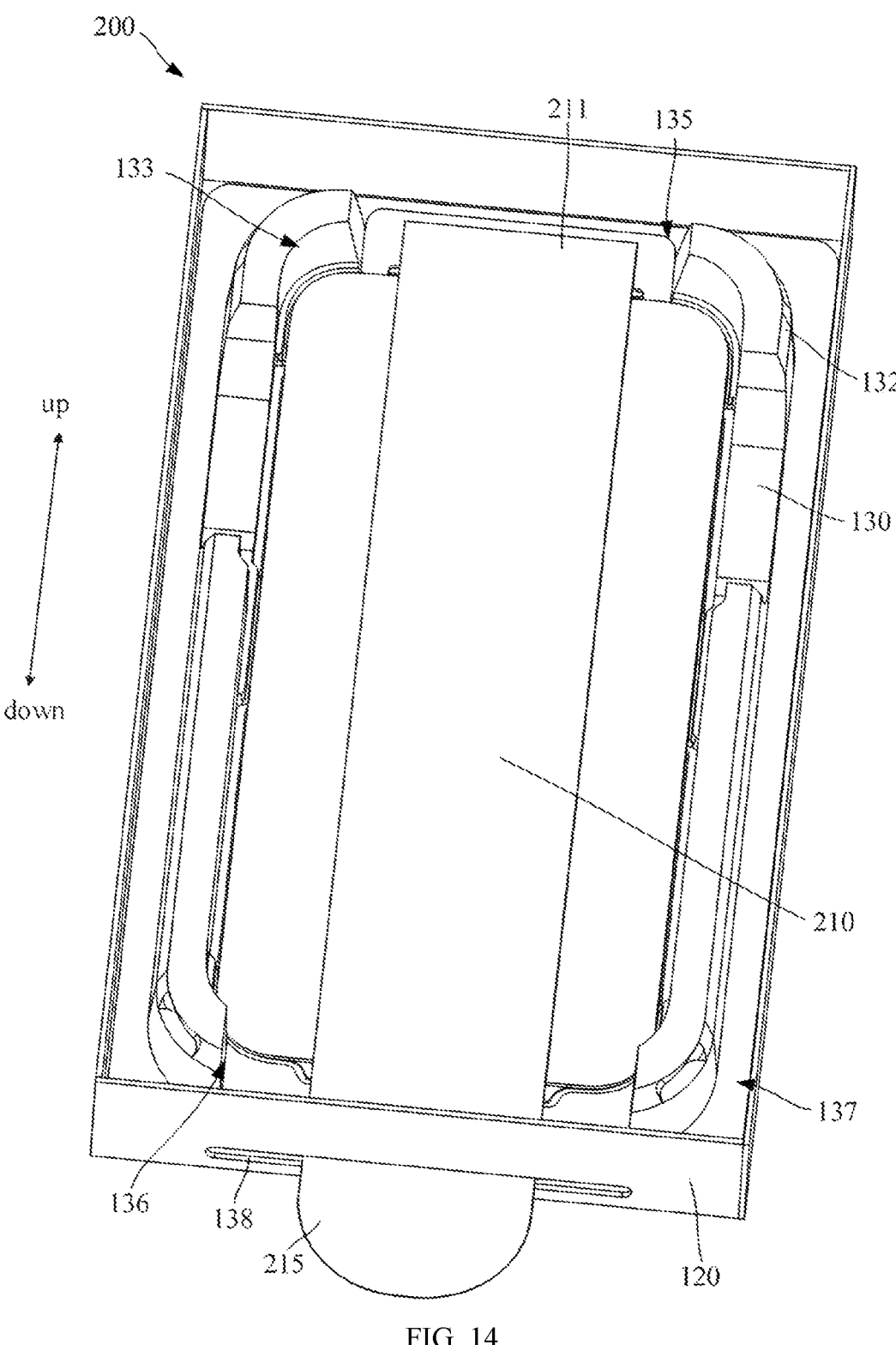
FIG. 14 is an internal structural schematic view of the protection film product in FIG. 12 from one perspective.

When the inner tray 130 is detachably installed at the base 120, in yet another embodiment, referring to FIG. 12, the base 120 is provided with an installing groove 137 opening toward the upper cover 110, the inner tray 130 is provided at the installing groove 137, an avoidance position 138 for a hand-tearing tension strap 215 to stretch out is provided at a side of the installing groove 137 facing the pulling notch 136, and the upper cover 110 is rotatably connected to a side wall of the installing groove 137.

Specifically, that is, the base 120 and the upper cover 110 together form an assembly box. The base 120, as the main body of the assembly box, is provided with an installation groove 137 that opens toward the direction of the upper cover 110. The upper cover 110 serves as a box cover, so that the assembly box can not only fix the inner tray 130, but also serve as a packaging box for the film sticking device 100. Moreover, the installation groove 137 opens toward the direction of the upper cover 110, the hand-tearing tension strap 215 of the screen protection film 210 passes through the pulling notch 136 and the avoidance position 138 in sequence and partially extends out of the installation groove 137 to facilitate user operation. The avoidance position can also be configured as an avoidance gap opened at a side wall of the installing groove 137; or, the avoidance position can be configured as an avoidance hole opened at a side wall of the installing groove 137; or directly removing the side wall of the installation groove 137 facing the pulling notch 136 to avoid the hand-tearing tension strap 215. At this time, the second compacting protrusion 124 can be provided on the baseplate 122 or directly on the chassis 131. In other embodiments, the base 120 and the upper cover 110 can also be configured as two half boxes spliced to each other.

The above embodiments are only some embodiments of the present application, and are not intended to limit the scope of the present application. Under the inventive concept of the present application, any equivalent structure or equivalent process transformation made by using the description and accompanying drawings of the present application, or directly or indirectly applied in other related technical fields, is included within the scope of the present application.

What is claimed is:

1. A film sticking device, comprising:

an upper cover and a base, wherein the upper cover is movably connected to a side of the base; and an inner tray comprising a chassis and a limiting frame provided at the chassis, wherein the limiting frame encloses a receiving groove on the chassis, an inner wall of the limiting frame is provided with a limiting step configured for installing a screen protection film, and a positioning notch and a pulling notch are respectively provided at two opposite sides of the limiting frame;

wherein the inner tray is detachably installed at the base, and the upper cover is configured to cover the receiving groove; and a first magnetic attraction portion is provided at a side of the limiting frame close to the upper cover, a second magnetic attraction portion is provided corresponding to the upper cover, and the first magnetic attraction portion and the second magnetic attraction portion are magnetically connected.

2. The film sticking device according to claim 1, wherein the inner tray is snap-connected to the base.

3. The film sticking device according to claim 2, wherein the chassis is provided with an installing skirt edge on an outside of the limiting frame, and the installing skirt edge is snap-connected to the base.

4. The film sticking device according to claim 2, wherein the base comprises a baseplate and a snapping plate fixed on the baseplate, the snapping plate is fixed at a side of the baseplate facing the upper cover, and the chassis is snap-connected to the snapping plate.

5. The film sticking device according to claim 2, wherein a first compacting protrusion is provided at a side of the upper cover facing the inner tray; and a second compacting protrusion is provided at a side of the base facing the inner tray, a through hole is provided on the chassis, and the second compacting protrusion passes through the through hole and extends into the receiving groove.

6. The film sticking device according to claim 1, wherein the chassis is provided with an installing skirt edge at an outside of the limiting frame, a limiting groove is formed at a periphery of the base, the limiting groove is configured to prevent the inner tray from detaching from the base in a direction closer to the upper cover, the limiting groove is provided with a pulling opening at at least one side of the base, and the installing skirt edge is inserted into the limiting groove via the pulling opening.

7. The film sticking device according to claim 6, wherein the upper cover is provided with a first compacting protrusion at a side facing the inner tray, and a second compacting protrusion is provided at a side of the chassis facing the receiving groove.

8. The film sticking device according to claim 1, wherein the chassis is provided with an installing skirt edge at an outside of the limiting frame, the base further comprises a baseplate and a pressure frame movably connected to the baseplate, and the pressure frame is configured to be sleeved on the limiting frame and compress the installing skirt edge to the base.

9. The film sticking device according to claim 1, wherein the base is provided with an installing groove opening toward the upper cover, the inner tray is provided at the installing groove, an avoidance position for a hand-tearing tension strap of the screen protection film to stretch out is provided at a side of the installing groove facing the pulling notch, and the upper cover is rotatably connected to a side wall of the installing groove.

10. The film sticking device according to claim 9, wherein:

the avoidance position is configured as an avoidance gap opened at a groove wall of the installing groove; or the avoidance position is configured as an avoidance hole opened at a groove wall of the installing groove.

11. The film sticking device according to claim 1, wherein the limiting step is supported at an edge of the screen protection film and allows the screen protection film to be spaced apart from the chassis.

12. The film sticking device according to claim 1, wherein the limiting step comprises a limiting surface and an abutting surface provided at an angle with the limiting surface, the limiting surface faces a side wall of the receiving groove, and the abutting surface faces an opening of the receiving groove to support the screen protection film.

13. The film sticking device according to claim 12, wherein the abutting surface is flush with a bottom surface of the positioning notch.

14. The film sticking device according to claim 1, further comprising:

at least another inner tray, wherein a plurality of the inner trays are configured to be stacked.

15. The film sticking device according to claim 1, further comprising:

at least one screen protection film, wherein each screen protection film is correspondingly provided at one inner tray, the screen protection film comprises a film body, a first release film and a second release film, the first release film and the second release film are respectively attached to two opposite sides of the film body; and two opposite ends of the first release film extend outward from the film body to the positioning notch and the pulling notch respectively, the second release film comprises a protective layer and a hand-tearing tension strap, the protective layer is attached to a surface of the film body, and a part of the hand-tearing tension strap adjacent to the positioning notch is connected to the protective layer and extends toward the pulling notch and out of the receiving groove.

16. The film sticking device according to claim 12, wherein a supporting surface is provided above the limiting surface, the supporting surface faces the opening of the receiving groove and is configured to support a device to be filmed, and a distance between the supporting surface and the abutting surface is greater than or equal to a thickness of the screen protection film.

17. The film sticking device according to claim 5, wherein the second compacting protrusion extends along a long side edge of the inner tray.

18. The film sticking device according to claim 4, wherein one side of the upper cover is bent and connected with a connecting plate, and the other side of the connecting plate is bent and connected to the baseplate.

* * * * *